United States Patent
Mao et al.

(10) Patent No.: US 8,781,479 B2
(45) Date of Patent: Jul. 15, 2014

(54) MOBILE DEVICE NETWORK SELECTION

(75) Inventors: Zhihong Mao, Dublin (IE); Stephen Goggin, Dublin (IE); Attila Pall, Dublin (IE); Grzegorz Lapinski, Balgriffin (IE); Kresimir Bozic, Dublin (IE); Dan Stevenson, Dublin (IE); Dan Teodosiu, Boulogne-Billancourt (FR)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/357,401

(22) Filed: Jan. 22, 2009

(65) Prior Publication Data

US 2010/0184440 A1    Jul. 22, 2010

(51) Int. Cl.
*H04W 36/00* (2009.01)

(52) U.S. Cl.
USPC ............ 455/444; 455/436; 455/437; 455/443

(58) Field of Classification Search
CPC ..................................................... H04W 88/06
USPC .................................................. 455/437, 444
See application file for complete search history.

(56) References Cited

U.S. PATENT DOCUMENTS

| | | | | |
|---|---|---|---|---|
| 7,089,005 | B2 * | 8/2006 | Reddy ........................... | 455/436 |
| 7,171,216 | B1 * | 1/2007 | Choksi ....................... | 455/456.1 |
| 7,319,413 | B1 | 1/2008 | Denker et al. | |
| 7,333,815 | B1 | 2/2008 | Holland | |
| 7,620,401 | B2 * | 11/2009 | Oh ................................ | 455/441 |
| 2004/0192352 | A1 | 9/2004 | Vallstrom et al. | |
| 2004/0203792 | A1 * | 10/2004 | Shaheen et al. ............ | 455/552.1 |
| 2004/0233930 | A1 | 11/2004 | Colby, Jr. | |
| 2007/0139191 | A1 | 6/2007 | Quatro | |
| 2007/0147311 | A1 * | 6/2007 | Brok ............................. | 370/335 |
| 2008/0207278 | A1 | 8/2008 | Qi et al. | |
| 2008/0318580 | A1 * | 12/2008 | Zhong et al. .................. | 455/444 |
| 2010/0273486 | A1 * | 10/2010 | Kharia et al. ................. | 455/436 |

OTHER PUBLICATIONS

Rahmati, et al., "Context-for-Wireless: Context-Sensitive Energy-Efficient Wireless Data Transfer", retrieved at <<http://www.ruf.rice.edu/~mobile/publications/rahmati07mobisys.pdf>>, MobiSys'07, Jun. 11-14, 2007, pp. 14.

Rekimoto, et al., "Personalized City by Continuous Location Logging", retrieved at <<http://www.andrew.cmu.edu/user/cdisalvo/chi2007workshop/papers/citychi07.pdf>>, pp. 1-4.

Kolodziej, Krzysztof, "Advances in GPS: Navizon", retrieved at <<http://www.lbszone.com/content/view/1171/26/>>, Aug. 3, 2006, pp. 4.

Paik, et al., "Design and Analysis of Management Software for In-Vehicle IPv6 Networks", retrieved at <<http://mmlab.snu.ac.kr/publications/docs/e87-b_7__1874.pdf>>, IEICE Trans. Communication, vol. E87-B, No. 7, Jul. 2004, pp. 1874-1882.

* cited by examiner

*Primary Examiner* — Huy C Ho

(74) *Attorney, Agent, or Firm* — Bryan Webster; Andrew Sanders; Micky Minhas

(57) ABSTRACT

The described implementations relate to automatic network selection in relation to wireless mobile devices. One method can be applied to a mobile device that has both Wi-Fi and cellular capabilities. The method can attempt to identify Wi-Fi network availability for the mobile device. This method also evaluates whether to configure the mobile device to accomplish data communication over an identified Wi-Fi network or a cellular network.

20 Claims, 7 Drawing Sheets

MOBILE DEVICE NETWORK SELECTION

BACKGROUND

Mobile devices, such as smart phones are emerging that have capabilities to access both cellular networks and Wi-Fi networks, among others. Cellular networks are widely available and reliable. However, a common revenue model for cellular service is that users tend to be charged for data communicated over the cellular networks. The availability of Wi-Fi networks is more limited than cellular, but data communication tends to be less expensive, or free to users.

Presently, users can manually select when the mobile device connects to a cellular network and when the mobile device connects to a Wi-Fi network. Manual network selection is tedious for users. Further, users tend to forget to control the mobile device in an efficient manner. For instance, the user may switch the mobile device to a Wi-Fi network as he/she uses the device and then forget to switch to cellular when leaving the Wi-Fi network (i.e., hot zone). Alternatively or additionally, the user may forget to re-select a Wi-Fi network for subsequent use. Still other users may not understand (or want to be bothered with) controlling their mobile devices to select specific networks. The present inventive concepts address aspects related to network selection and can lead to enhanced user satisfaction.

SUMMARY

The described implementations relate to automatic network selection in relation to wireless mobile devices. One method can be applied to a mobile device that has both Wi-Fi and cellular capabilities. The method can attempt to identify Wi-Fi network availability for the mobile device. This method also evaluates whether to configure the mobile device to accomplish data communication over an identified Wi-Fi network or a cellular network.

Another method can obtain location information relating to a mobile device. The method can check for network information that is associated with the location information. The method can automatically select a network for data communication for the mobile device based upon the network information.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application relates to mobile devices and automatic selection of networks for the mobile device. Networks that can be selected can include, but are not limited to, cellular networks, Wi-Fi networks, and WiMAX networks. For instance, the method can select between one or more available cellular networks and one or more available Wi-Fi networks or Wi-Fi hotspots. Automatic network selection can be based upon one or more network selection criteria or parameters. Stated another way, the mobile device can select a network from the available networks that satisfies the network selection criteria(s) and, as such, the process can be thought of as 'smart network selection'. Examples of network selection criteria are described in more detail below, but briefly, network selection criteria can include location information, battery usage rate, available battery power, and data communication cost, among others. Note that as used herein, the term 'network selection' refers to selecting a network for a majority of data communication at a particular time and/or location and does not necessarily imply exclusivity. Instead, the mobile device can concurrently be connected to other non-selected networks.

Figure 1:
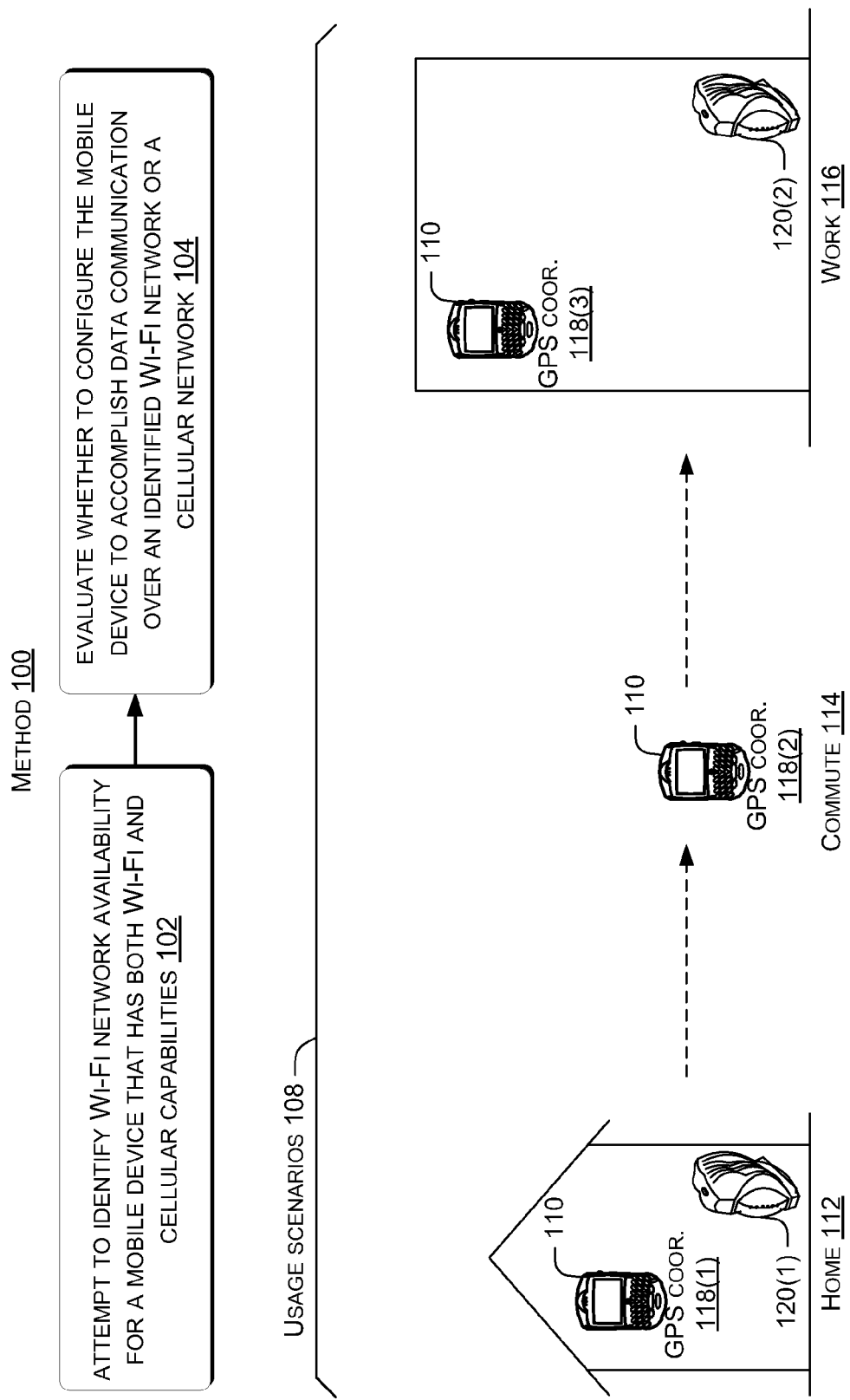
FIG. 1 shows an exemplary method for implementing automatic network selection in accordance with some implementations of the present concepts.

FIG. 1 offers an introductory implementation in the form of an automatic network selection method 100. At block 102, the method attempts to identify Wi-Fi network availability for a mobile device that has both Wi-Fi and cellular capabilities. In some cases, Wi-Fi network availability can be identified by actually receiving signals from a Wi-Fi network. For instance, Wi-Fi networks can periodically transmit a beacon signal that identifies the Wi-Fi network. The method can use a received beacon signal, or other means, to identify available networks.

Wi-Fi network availability can also be pre-determined. In some cases, a dataset can be created that maps or associates Wi-Fi networks with location information. For example, an entry in the dataset can indicate that at hypothetical location XYZ a Wi-Fi network ABC is available. The present location of a mobile device can be checked against the dataset to determine the availability of a Wi-Fi network. In this manner, Wi-Fi availability can be accomplished without actually attempting to detect the Wi-Fi network at the time the method is executed. Such a configuration can offer a power saving to the mobile device as will be described below.

At block 104, the method evaluates whether to configure the mobile device to accomplish data communication over an identified Wi-Fi network or a cellular network. The evaluation can be based upon one or more network selection criteria. Non-limiting examples of network selection criteria can include, location information, battery usage, speed (i.e., data communication rate) and/or data communication cost, among others. Battery usage can be considered since maintaining communications with and/or searching for a Wi-Fi network may utilize more power than maintaining communications with a cellular network. Cost can be a consideration in that users are often charged per unit of data communicated over a cellular network. In contrast, data communication over a Wi-Fi network is often free. Speed can be a consideration, especially for data intensive scenarios, such as video transmission. The network selection criteria can be included in the mobile device's operating instructions and/or defined by a user. An example of how network selection criteria can be defined by a user is described in relation to FIG. 4.

For purposes of explanation, consider exemplary usage scenarios indicated generally at 108 that relate to a mobile device 110 of a user. (The user is not shown due to space constraints on the drawing page. Assume that the user is carrying the mobile device 110 and thus the presence of the mobile device in the FIGURE conveys the presence of the user). Usage scenarios 108 include the user at home at 112, commuting at 114, and at work at 116. Assume that a cellular network (not shown) is available to mobile device 110 in each of the usage scenarios 112-116.

In home usage scenario 112, assume that mobile device 110 generates location information in the form of GPS coordinates 118(1). Assume further, that the mobile device has previously identified the user's home Wi-Fi network 120(1) and mapped the home Wi-Fi network to location information, such as in a dataset. Based upon the location information, the mobile device 110 can automatically select home Wi-Fi network 120(1) for data communication. The method can then cause the mobile device to be configured to achieve data communication over the selected Wi-Fi network 120(1).

In usage scenario 114 the user is commuting to work. In this scenario, assume that GPS coordinates 118(2) do not correspond to a Wi-Fi network so mobile device 110 can automatically select the available cellular network for data communication. Utilizing the location information to determine Wi-Fi network availability can offer significant power savings over actively listening for a Wi-Fi network during the commute scenario 114.

Once the user reaches work in scenario 116, mobile device 110 can automatically switch to Wi-Fi network 120(2) based upon the location information provided by GPS coordinates 118(3).

Now, consider another example where the user has defined multiple network selection criteria for the automatic network selection process. Assume that the user has defined that network selection should be based upon cost, as one network selection criteria, and maintaining network integrity during active use of the mobile device 110 (i.e., avoid network switching when the mobile device is being used) as a second network selection criteria. Assume also that the mobile device has an encoded network selection criteria to preserve battery power when possible.

Beginning again at home scenario 112, assume that mobile device 110 has automatically selected the user's home Wi-Fi network 120(1) for data communication, but that the mobile device is currently inactive. In such a case, the home Wi-Fi network may be automatically selected for data communication, but the mobile device may maintain the cell network and only actually switch to the home Wi-Fi network if data communication occurs. For instance, the Wi-Fi network is automatically selected, but the switching does not actually occur until the user picks up the mobile device and starts surfing the web or places/receives a call.

When the user begins commute scenario 114, the mobile device 110 automatically switches to a cellular network. Further, based upon location information, the mobile device may shut off the Wi-Fi component to preserve battery power. Also, the mobile device may not use battery resources to attempt to identify Wi-Fi networks during the commute unless the dataset indicates Wi-Fi availability at locations along the commute.

Some implementations can utilize a history of location information to determine whether or not to seek to identify available Wi-Fi networks. For instance, if the location history shows that the mobile device 110 has been at a given location before and that no Wi-Fi networks were detected, then the method can avoid using battery resources to seek a Wi-Fi network at that location this time. This would avoid using battery resources looking for Wi-Fi networks along the same commute route every day. Of course, the method could periodically re-examine individual locations to identify newly installed Wi-Fi networks. For instance, once a month, the method could re-evaluate a given location to determine if a new Wi-Fi network is available and/or if existing networks are still functional.

Assume now that during the commute scenario 114, the user begins to actively use the mobile device 110 over the cellular network. For instance, the user may call someone or be downloading and viewing a video. Upon arrival at work scenario 116, the mobile device can evaluate the network selection criteria and may maintain the cellular network connection while the user is actively using the mobile device 110. As noted above, one of the user-defined network selection criteria in this example is maintaining network integrity during active use of the mobile device 110. The mobile device can automatically select Wi-Fi network 120(2) for data communication at the work scenario 116, but not actually switch networks until the user finishes using the mobile device. To summarize, in this example, automatic network selection can evaluate a combination of user defined criteria and 'coded' criteria in a smart network selection process. Other examples are described below.

Exemplary Operating Environments

Figure 2:
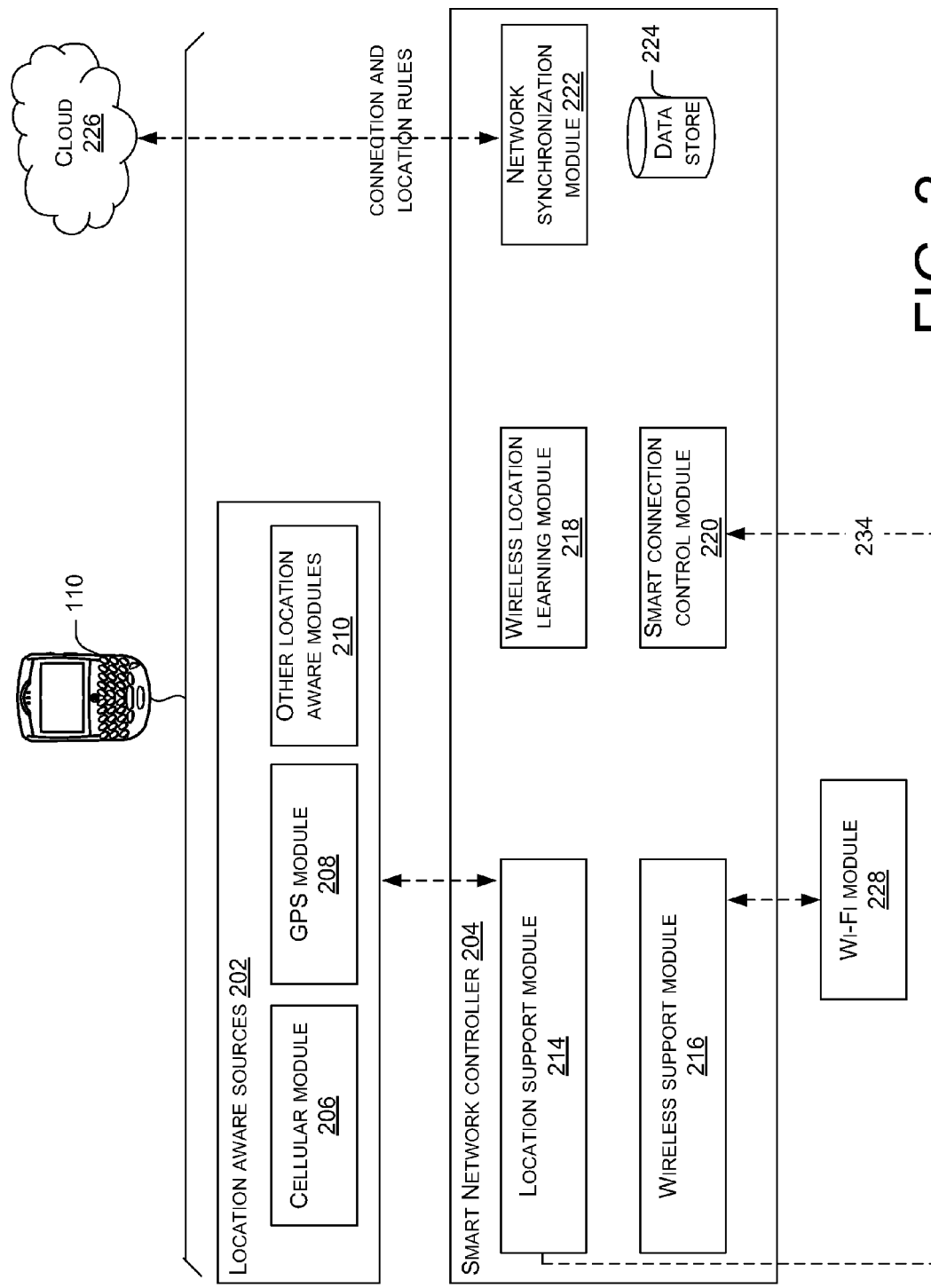
FIG. 2 illustrates exemplary components for accomplishing automatic network selection in accordance with some implementations of the present concepts.

FIG. 2 shows exemplary components of mobile device 110 for accomplishing automatic network selection concepts. In this case, for organizational purposes the components are grouped under location aware sources 202 and smart network controller 204.

In this configuration, location aware sources 202 include a cellular module 206, a GPS module 208, and other location-aware modules 210 that are not called out with specificity.

Smart network controller 204 includes a location support module 214, a wireless support module 216, a wireless location module 218, a smart connection control module 220 a network synchronization module 222, and a datastore or database 224 that can be communicably coupled to one another.

Network synchronization module 222 is communicably coupled to a cloud (i.e., data obtained or maintained beyond the mobile device) 226. A Wi-Fi module 228 is coupled to the smart network controller's wireless support module 216.

Location aware sources 202 can be any source that can provide absolute or relative location information. For instance, briefly stated, cellular module 206 can receive cell tower identifications (IDs) that provide location information relative to a specific cell tower. Further, where multiple cell tower IDs are received simultaneously, triangulation can be utilized to provide more precise location information.

A cell network can include a set of cell towers that broadcast over a "cell" or region. An example of which is described below in relation to FIG. 5. The cell towers are generally arranged to have some overlap between adjacent cells. Each cell tower has a unique ID that the cell tower broadcasts and which can be received by the mobile device 110 when in range of the cell tower. Location information can be obtained by triangulation of signals from multiple overlapping cell towers. Such an example is described below in relation to FIG. 5.

An example of absolute location information can be global positioning system coordinates, which can be obtained by GPS module 208. In some configurations, multiple sources can work cooperatively to provide location information. For instance, assisted GPS or A-GPS utilizes a cellular network to assist in gathering GPS coordinates where the GPS module 208 may have difficulty receiving GPS signals directly.

The smart network controller's location Support Module 214 can communicate with, and otherwise manage, the location aware source(s) 202. The location support module 214 can feed location information to other components of the smart network controller 204.

Wireless control module 216 can manage interactions with the Wi-Fi module 228, such as on/off and signal strength. A stronger signal strength can pick up weaker Wi-Fi network signals but generation of a stronger signal uses more battery power. So for instance, at a given location that has a known strong Wi-Fi network, the wireless control module 216 may instruct the Wi-Fi module 228 to operate at relatively low signal strength. The relatively low signal strength can be sufficient to communicate with the strong Wi-Fi network and yet use less battery resources than operating at a stronger signal strength. Further, the wireless control module 216 can control the signal strength employed by the Wi-Fi module 228 when searching for Wi-Fi networks at new locations.

Wireless location learning module 218 can be used to search for new Wi-Fi hotspots. The wireless location learning module can operate cooperatively with the wireless control module 216 to control the Wi-Fi module 228. For instance, the wireless location learning module can, at a location-by-location basis, cause the Wi-Fi module to power-up to detect Wi-Fi network beacons. Any Wi-Fi networks that are discovered at a given location can be mapped to the location in datastore 224.

Smart connection control module 220 can contain the network selection criteria that are used in smart management of the mobile device 110. A list of network selection criteria that the system could base its decisions on can include location, time, data usage, user preferences, battery use, and device performance, among others. Smart connection control module 220 can also retrieve stored connection credentials, such as user names and passwords to automatically log on to selected networks.

In some implementations, smart connection control module 220 can cause a user-interface to be generated that allows the user to define and/or rank criteria. An example of such a user-interface is described below in relation to FIG. 3.

Datastore 224 can be used to hold information such as the Wi-Fi/location mapping (i.e. associate location information and corresponding network information), the network selection criteria and the Wi-Fi connection credentials. For instance, an entry in the datastore can map hypothetical location XYZ to Wi-Fi network ABC. The entry can further list the user's credentials, such as user name and password for the network.

The datastore 224 can be generated by an individual mobile device 110. For instance, when mobile device 110 detects an available network, the mobile device can store the network information in the dataset with associated location information.

Alternatively or additionally, datasets can be generated generically for access by individual mobile devices based upon location information. For instance, datasets may be generated that show the Wi-Fi networks available in a particular city or country.

Network synchronization module 222 can update datastore 224 with network information obtained from cloud 226 and/or can upload data from datastore 224 to a central server based datastore in cloud 226. Still further, datasets can be hybridized to include mappings made by the mobile device and cloud mappings.

Figure 3:
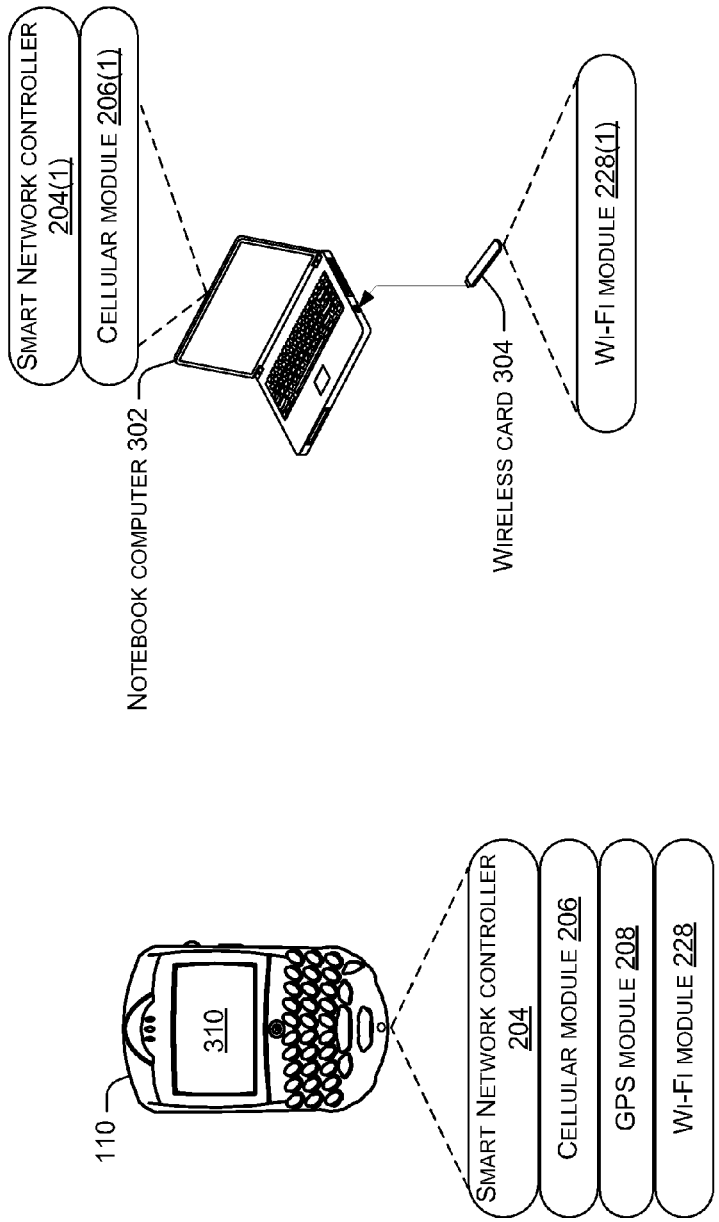
FIG. 3 illustrates an exemplary operating environment that includes several mobile devices configured to accomplish automatic network selection in accordance with some implementations of the present concepts.

FIG. 3 shows an operating environment 300 that includes several exemplary mobile device embodiments upon which automatic network selection concepts can be employed. Operating environment 300 includes mobile device 110 carried over from FIGS. 1-2. Mobile device 110 is representative of mobile devices in the ever evolving class of devices that presently includes cell phones, smart phones, and personal digital assistants (PDAs), etc. Operating environment 300 also includes a mobile device in the form of notebook computer 302 and another mobile device in the form of a wireless card or stick 304.

In this case, mobile device 110 represents a generally free-standing configuration that includes smart network controller 204, cellular module 206, GPS module 208, and Wi-Fi module 228, each of which were introduced above in relation to FIG. 2 and, as such, are not re-introduced here. The cellular module 206 can provide cellular capabilities to the mobile device while the Wi-Fi module can provide Wi-Fi capabilities. As mentioned above, this configuration can gather location information and employ smart network selection to select either the cellular module 206 or the Wi-Fi module 228 for data communication in various scenarios.

Either or both of notebook computer 302, and wireless stick 304, can be configured in a similar free-standing configuration as mobile device 110. For instance, notebook computer 302 can be manufactured with the components illustrated relative to mobile device 110 internally installed so that the notebook computer is ready to use when received by a purchasing user.

However, in this case, mobile devices 302, 304 can provide an example of how multiple devices can be employed together to accomplish smart network selection. Here, notebook computer 302 includes a cellular module 206(1) and wireless card 304 includes a Wi-Fi module 228(1). Wireless card 304 can also include a driver (not shown) that when run on notebook computer 302 installs smart network controller 204(1). Wireless card 304 can be coupled to notebook computer 302, such as via a universal serial bus (USB) port. The installed smart network controller 204(1) can automatically selectively control both the notebook computer's cellular module 206(1) and the wireless card's Wi-Fi module 228(1).

Figure 4:
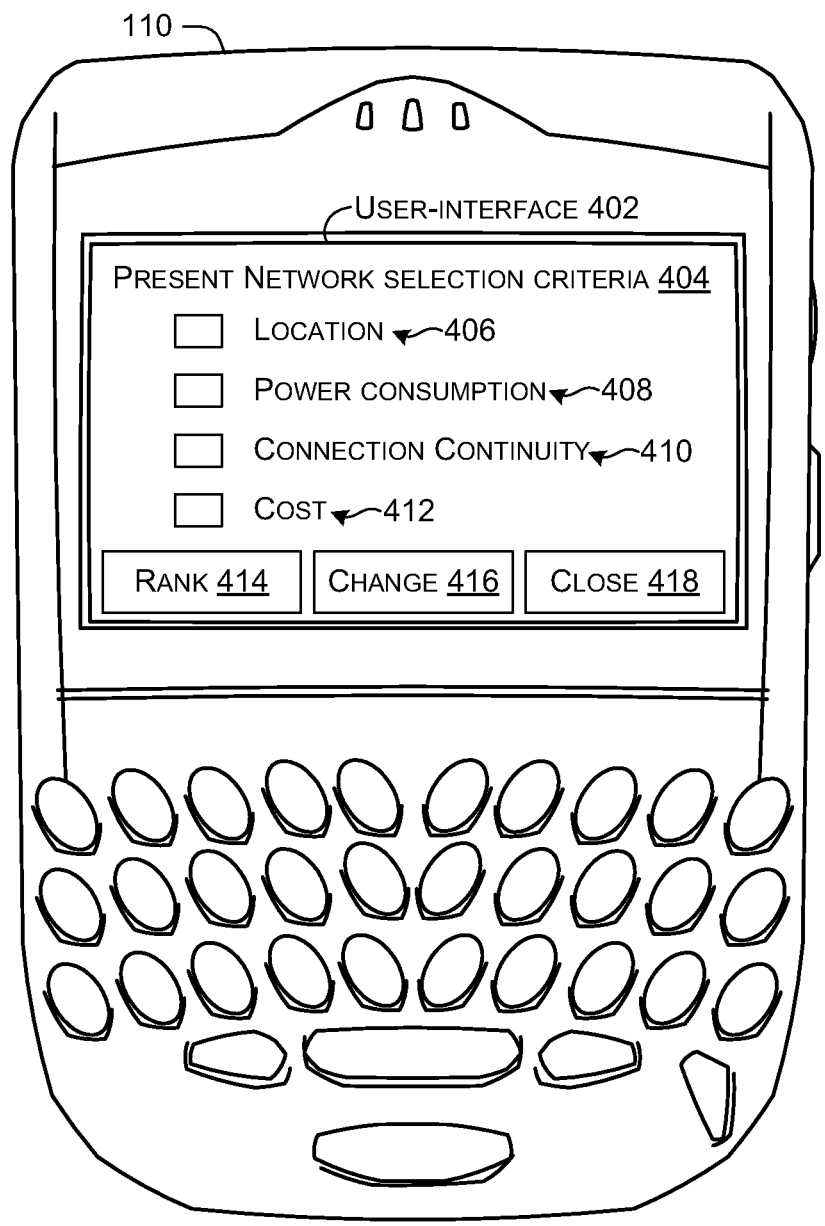
FIG. 4 illustrates an exemplary user-interface generated on a mobile device to allow a user to define automatic network selection criteria in accordance with some implementations of the present concepts.

FIG. 4 shows a network selection criteria user-interface 402 generated on mobile device 110. User-interface 402 lists the present network selection criteria at 404. In this example, the present network selection criteria are location 406, power consumption 408, connection continuity 410, and cost at 412. The user can select to rank the present criteria at 414, select to change the criteria at 416, or close the user-interface at 418. Ranked criteria can be assigned different weights during the evaluation process described above at block 104 of FIG. 1.

In some implementations, user-interface 402 allows the user to predefine network selection criteria that apply to all scenarios. Other implementations can allow the user to customize the network selection criteria based upon location, or another factor. For instance, relative to a specific location, the user may specify which of several available Wi-Fi networks and/or WiMAXX networks should be utilized. In another case, the user may specify different network selection criteria within a home cell area than outside that home cell area. For instance, roaming costs outside the home cell area may result in higher data communication charges that the user wants to avoid. In such a case, the criteria outside the home cell area may prioritize avoiding roaming charges over other network selection criteria.

In still another example, the user can make rankings that are dependent upon other factors. For instance, the user may rank data communication cost as the highest priority network selection criteria unless the mobile device's battery power falls below 25% at which time battery usage becomes the highest ranked network selection criteria.

Figure 5:
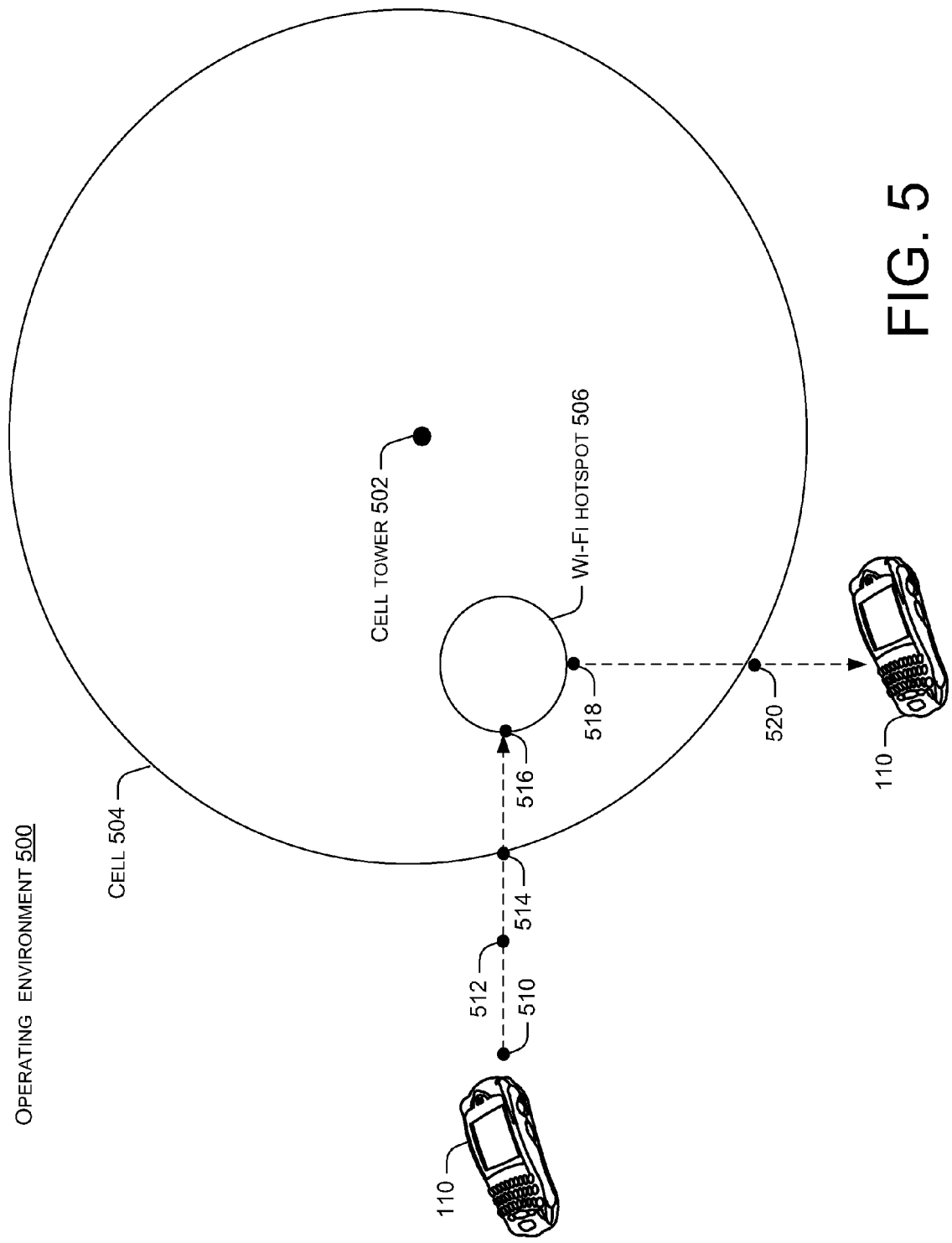
FIGS. 5-6 illustrate exemplary operating environments in which location information can be gathered for accomplishing automatic network selection in accordance with some implementations of the present concepts.

FIG. 5 shows an operating environment 500 that explains how smart network selection can be accomplished in some implementations. Operating environment 500 includes a cell tower 502 that sends and receives cellular signals in a cell 504. A user (via mobile device 110) starts at point 510 and moves from left to right on the drawing page. At this point mobile device 110 may or may not have cell service from another cell tower (not shown). Assume that the mobile device does not have any record of Wi-Fi networks being available at points 510 or 512, but does have a record of Wi-Fi availability associated with cell tower 502. During the period between point 510 and point 512, the mobile device may not turn on its Wi-Fi capabilities in order to save battery power.

As the user moves toward point 514, mobile device 110 obtains the unique ID of cell tower 502 (i.e., enters cell 504). The mobile device can start to constantly, or periodically, listen for a beacon from Wi-Fi hotspot 506. Once the beacon is obtained at point 516, the mobile device can select to utilize Wi-Fi data communication according to the criteria described above in relation to FIG. 4. The mobile device may lose the Wi-Fi hotspot at about point 518 and can cease to listen for the Wi-Fi hotspot at point 520 when the mobile device leaves cell 504.

Figure 6:
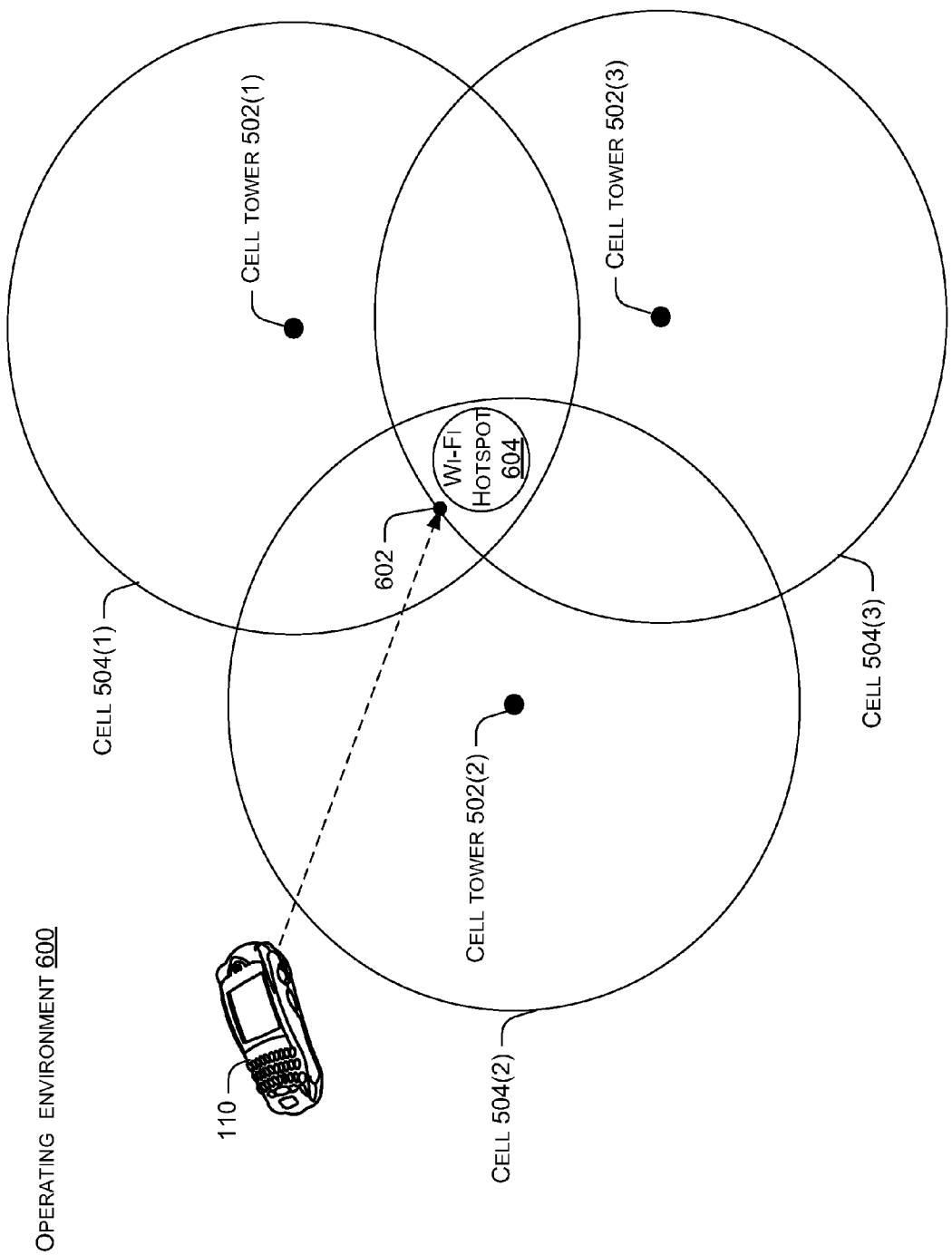

FIG. 6 shows another operating environment 600. In this case, three adjacent cell towers 502(1), 502(2), and 502(3) are shown with their respective cells 504(1), 504(2), and 504(3). In this case, when the user travels to point 602, mobile device 110 can receive a unique cell identification (ID) from each of cell towers 502(1), 502(2), and 502(3). Simultaneous receipt of the three unique IDs can be used to triangulate the location relatively precisely. This configuration can allow the mobile device to avoid using battery power to generate a Wi-Fi signal until it is proximate Wi-Fi hotspot 604. The skilled artisan should recognize other techniques for establishing a relative and/or absolute location from information available to mobile device 110.

Exemplary Methods

Figure 7:
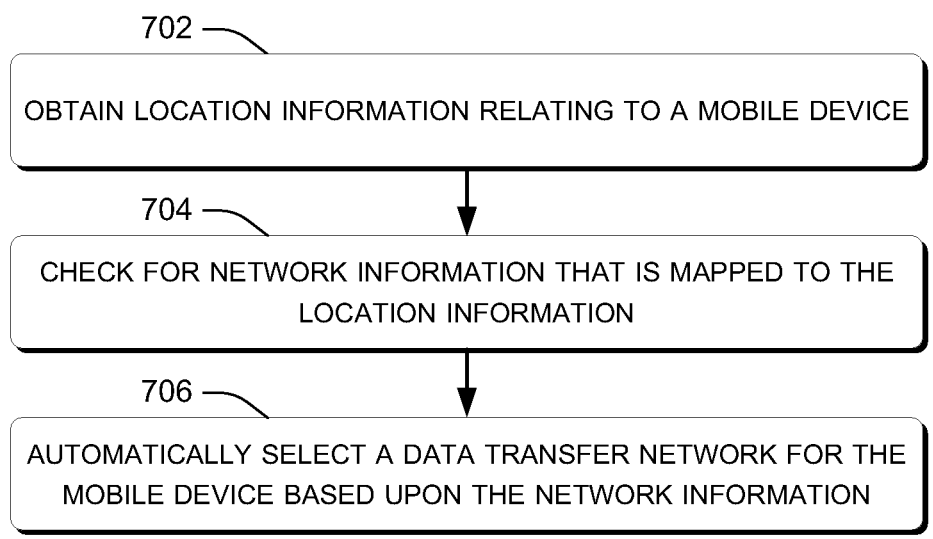
FIG. 7 is a flowchart of exemplary automatic network selection methods in accordance with some implementations of the present concepts.

FIG. 7 illustrates a flowchart of a method or technique 700 that is consistent with at least some implementations of the present concepts. The order in which the method 700 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on a computer-readable storage media as a set of instructions such that execution by a computing device causes the computing device to perform the method.

At block 702, the method obtains location information relating to a mobile device. Various examples for obtaining location information are described above in relation to FIGS. 1-6.

At block 704, the method checks for network information that is mapped to the location information. In one example, the method can check a data set for a given location to identify associated network information.

At block 706, the method automatically selects a data transfer network for the mobile device based upon the network information. For instance, if no network information is associated with the location information, then one implementation can default to selecting a cellular network. Other implementations can attempt to generate network information by searching for available networks, such as Wi-Fi networks. The selection can then be based upon the search results. In an instance where network information is associated with the location information, then the method can select an associated network. For instance, in one configuration, the method may default to an available Wi-Fi network. Other implementations may consider multiple network selection criteria in evaluating which available network to utilize. Examples of these and other scenarios are described above.

Conclusion

Although techniques, methods, devices, systems, etc., pertaining to automatic network selection scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A hardware computer-readable storage media having instructions stored thereon that when executed by a mobile device cause the mobile device to perform acts, the acts comprising:

displaying, on the mobile device, a user-interface identifying multiple network selection criteria including at least a data communication cost criterion and a battery power criterion;

receiving, by the mobile device, user inputs identifying less than all of the multiple network selection criteria displayed via the user-interface, the user inputs identifying the data communication cost criterion and the battery power criterion;

while a Wi-Fi module of the mobile device is powered off to save battery power of the mobile device, obtaining location information relating to the mobile device;

accessing a datastore to check for network information for an individual Wi-Fi network that is associated with the location information;

in a first instance when the battery power of the mobile device has not fallen below a predetermined value, ranking the data communication cost criterion relatively higher than the battery power criterion and performing a first evaluation of the individual Wi-Fi network based upon at least the data communication cost criterion being ranked higher than the battery power criterion; and in a second instance when the battery power of the mobile device has fallen below the predetermined value, ranking the battery power criterion relatively higher than the data communication cost criterion and performing a second evaluation of the individual Wi-Fi network based upon at least the battery power criterion being ranked higher than the data communication cost criterion; and in the first instance and the second instance, automatically selecting the individual Wi-Fi network or a different network for data communication for the mobile device based upon the first evaluation and the second evaluation, respectively.

2. The hardware computer-readable storage media of claim 1, wherein the obtaining comprises one of: obtaining absolute location information and obtaining relative location information.

3. The hardware computer-readable storage media of claim 1, wherein the obtaining comprises receiving a unique identification from at least one cell tower while the Wi-Fi module of the mobile device is powered off to save battery power.

4. The hardware computer-readable storage media of claim 1, wherein the obtaining comprises calculating an absolute location from global positioning system (GPS) data or from assisted GPS data while the Wi-Fi module of the mobile device is powered off to save battery power.

5. The hardware computer-readable storage media of claim 1, the acts further comprising:
causing the Wi-Fi module to power up to detect beacons of multiple Wi-Fi networks including the individual Wi-Fi network; and
mapping corresponding locations of the multiple Wi-Fi networks to the datastore.

6. The hardware computer-readable storage media of claim 1, wherein the different network comprises at least one available cellular network and the automatically selecting comprises automatically selecting the individual Wi-Fi network in the first instance and the at least one available cellular network in the second instance.

7. The hardware computer-readable storage media of claim 1, embodied in the mobile device.

8. The hardware computer-readable storage media of claim 1, wherein the predetermined value is a percentage of available battery power.

9. A mobile device comprising at least one hardware computer-readable storage media storing instructions that, when executed by the mobile device, cause the mobile device to:
display a network selection criteria user-interface to a user, the network selection criteria user-interface displaying a plurality of network selection criteria to the user including at least a data communication cost criterion;
receive a user input identifying the data communication cost criterion from the plurality of network selection criteria that are displayed on the mobile device, the user input being received via the displayed network selection criteria user-interface;
after the user selects the data communication cost criterion, perform an evaluation of a non-cellular wireless network and a cellular network based on the data communication cost criterion selected by the user;
select one of the non-cellular wireless network or the cellular network as a selected network for communication based on the evaluation; and
cause the mobile device to communicate over the selected network.

10. The mobile device of claim 9, wherein the instructions cause the mobile device to:
receive further user inputs ranking other user-selected network selection criteria relative to one another and the data communication cost criterion; and
assign different weights to the data communication cost criterion and the other user-selected network selection criteria based on the ranking,
wherein the different weights are used to perform the evaluation.

11. The mobile device of claim 9, wherein the network selection criteria user-interface displayed on the mobile device comprises:
a first displayed selection element for the user to identify a location criterion to include user-selected network selection criteria,
a second displayed selection element for the user to identify a power consumption criterion to include in the user-selected network selection criteria,
a third displayed selection element for the user to identify a connection connectivity criterion to include in the user-selected network selection criteria, and
a fourth displayed selection element for the user to identify the cost criterion to include in the user-selected network selection criteria.

12. The mobile device of claim 9, wherein the instructions cause the mobile device to:
in an instance when the non-cellular wireless network is free of charge and the cellular network is not free of charge, select the non-cellular wireless network as the selected network instead of the cellular network.

13. The mobile device of claim 9, wherein the instructions cause the mobile device to:
in an instance when using the cellular network would incur roaming costs, communicate over the non-cellular wireless network instead of the cellular network.

14. A mobile device, comprising:
a Wi-Fi module configured to communicate via Wi-Fi;
a wireless location learning module configured to search for one or more Wi-Fi hotspots by causing the Wi-Fi module to power-up to detect one or more Wi-Fi network beacons that indicate presence of one or more Wi-Fi networks that are available to the mobile device;
a datastore configured to map the one or more Wi-Fi networks to one or more corresponding locations where the Wi-Fi networks are available;
a user-interface configured to:
display multiple network selection criteria that are selectable by a user, the displayed multiple network selection criteria including at least a power consumption criterion, and
receiving user inputs selecting the power consumption criterion and another network selection criterion from the multiple network selection criteria; and
a connection control module configured to:
after the user selects the power consumption criterion and the another network selection criterion:
identify an individual Wi-Fi network from the datastore for data communication based upon a present location of the mobile device, and
evaluate the individual Wi-Fi network using the power consumption criterion and the another network selection criterion.

15. The mobile device of claim 14, further comprising a location support module configured to obtain location information associated with the individual Wi-Fi network.

16. The mobile device of claim 15, wherein the wireless location learning module is configured to send information about the individual Wi-Fi network and the associated location information to the datastore for mapping.

17. The mobile device of claim 14, further comprising a network synchronization module configured to update the datastore with network availability information that was not obtained by the mobile device.

18. The mobile device of claim 14, wherein the connection control module is further configured to cause the mobile device to communicate over the individual Wi-Fi network instead of a cellular network when available battery power of the mobile device exceeds a threshold.

19. The mobile device of claim 18, wherein the connection control module is further configured to cause the mobile device to communicate over the cellular network instead of the individual Wi-Fi network when the available battery power of the mobile device does not exceed the threshold.

20. The mobile device of claim 14, wherein the wireless location learning module and the connection control module are embodied as executable instructions that are executed by the mobile device.

* * * * *